(12) United States Patent
Matsuda et al.

(10) Patent No.: US 9,075,857 B2
(45) Date of Patent: Jul. 7, 2015

(54) COMPUTER-READABLE NON-TRANSITORY MEDIUM STORING THEREIN A CONTROL PROGRAM, MANAGEMENT APPARATUS, AND INFORMATION PROCESSING SYSTEM

(71) Applicant: FUJITSU LIMITED, Kawasaki-shi, Kanagawa (JP)

(72) Inventors: Satoshi Matsuda, Yokohama (JP);
Kenichi Shimazaki, Yokohama (JP);
Kazunao Muramoto, Yokohama (JP);
Shinnosuke Nagakura, Yokohama (JP);
Hiroki Matsueda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 13/747,604

(22) Filed: Jan. 23, 2013

(65) Prior Publication Data
US 2013/0262380 A1 Oct. 3, 2013

(30) Foreign Application Priority Data
Mar. 28, 2012 (JP) ................................ 2012-074420

(51) Int. Cl.
*G06F 17/00* (2006.01)
*G06F 17/30* (2006.01)
*H04L 12/24* (2006.01)

(52) U.S. Cl.
CPC .... *G06F 17/30581* (2013.01); *G06F 17/30557* (2013.01); *H04L 41/024* (2013.01)

(58) Field of Classification Search
CPC ................... G06F 17/30067; G06F 17/30575
USPC .................................. 707/622, 623, 625, 627
See application file for complete search history.

(56) References Cited

U.S. PATENT DOCUMENTS

| 6,286,004 | B1 * | 9/2001 | Yoshiura et al. ............... 707/615 |
| 2011/0004675 | A1 * | 1/2011 | Wada et al. .................... 709/220 |
| 2011/0093688 | A1 * | 4/2011 | Wada et al. ........................ 713/1 |
| 2011/0153678 | A1 | 6/2011 | Matsubara et al. |
| 2012/0191599 | A1 * | 7/2012 | Rigby .............................. 705/40 |

FOREIGN PATENT DOCUMENTS

| JP | 8-123747 | 5/1996 |
| JP | 2011-133985 | 7/2011 |
| WO | WO 2009/122527 A1 | 10/2009 |
| WO | WO 2009/157062 A1 | 12/2009 |

* cited by examiner

*Primary Examiner* — Rehana Perveen
*Assistant Examiner* — Loc Tran
(74) *Attorney, Agent, or Firm* — Staas & Halsey LLP

(57) ABSTRACT

A computer-readable, non-transitory medium storing therein a control program that causes a management apparatus to execute an operation, the operation comprises specifying, from among a plurality of databases, a database with the highest frequency of update of target data to be integrated which is stored in the database, transmitting, in accordance with acquisition of update data from the specified database, to a database other than the specified database among the plurality of databases, a request to transmit information stored in the database other than the specified database to the management apparatus and updating the target data to be integrated on the basis of the information transmitted to the management apparatus by the database other than the specified database in accordance with the request.

6 Claims, 18 Drawing Sheets

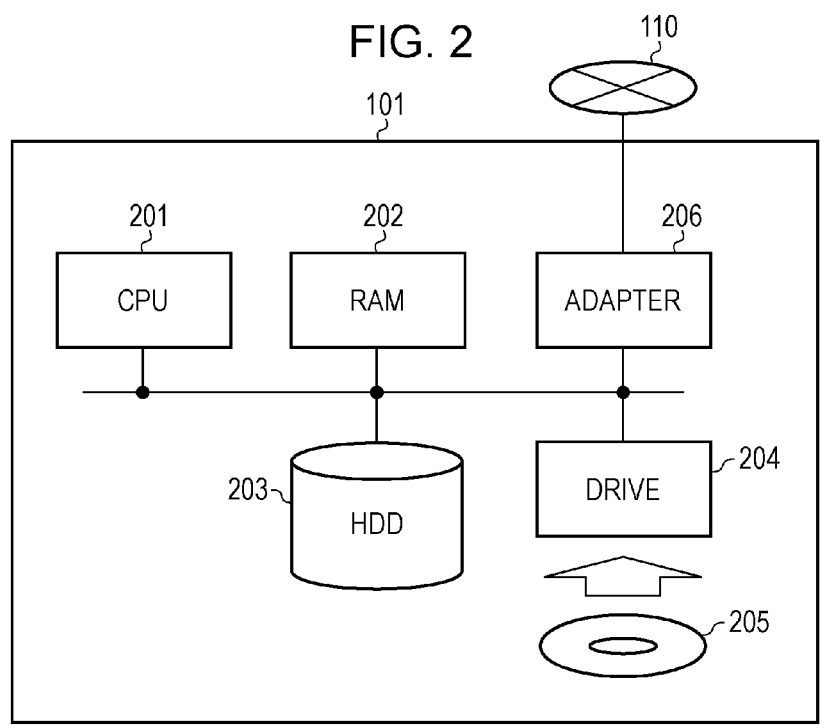
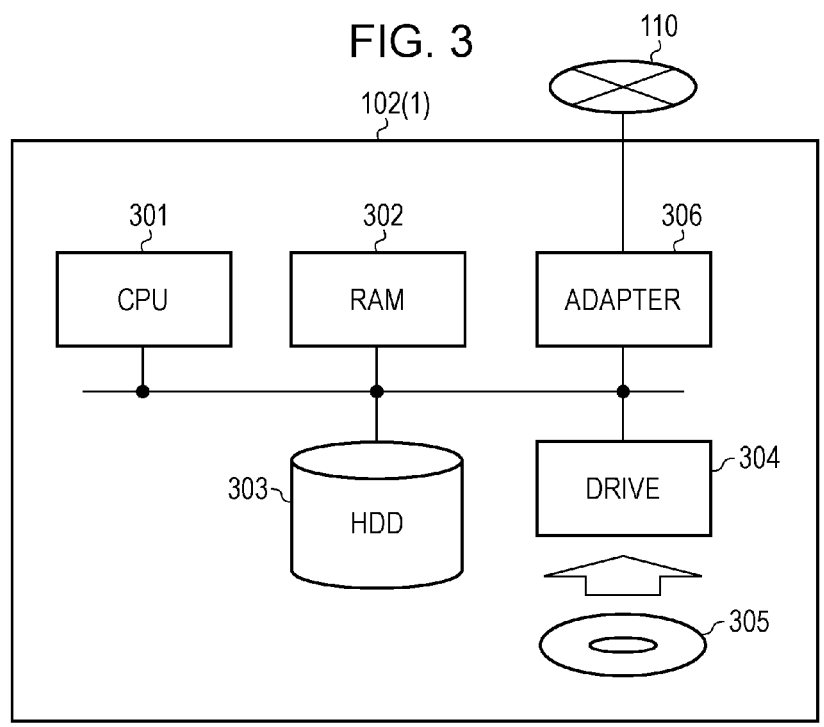

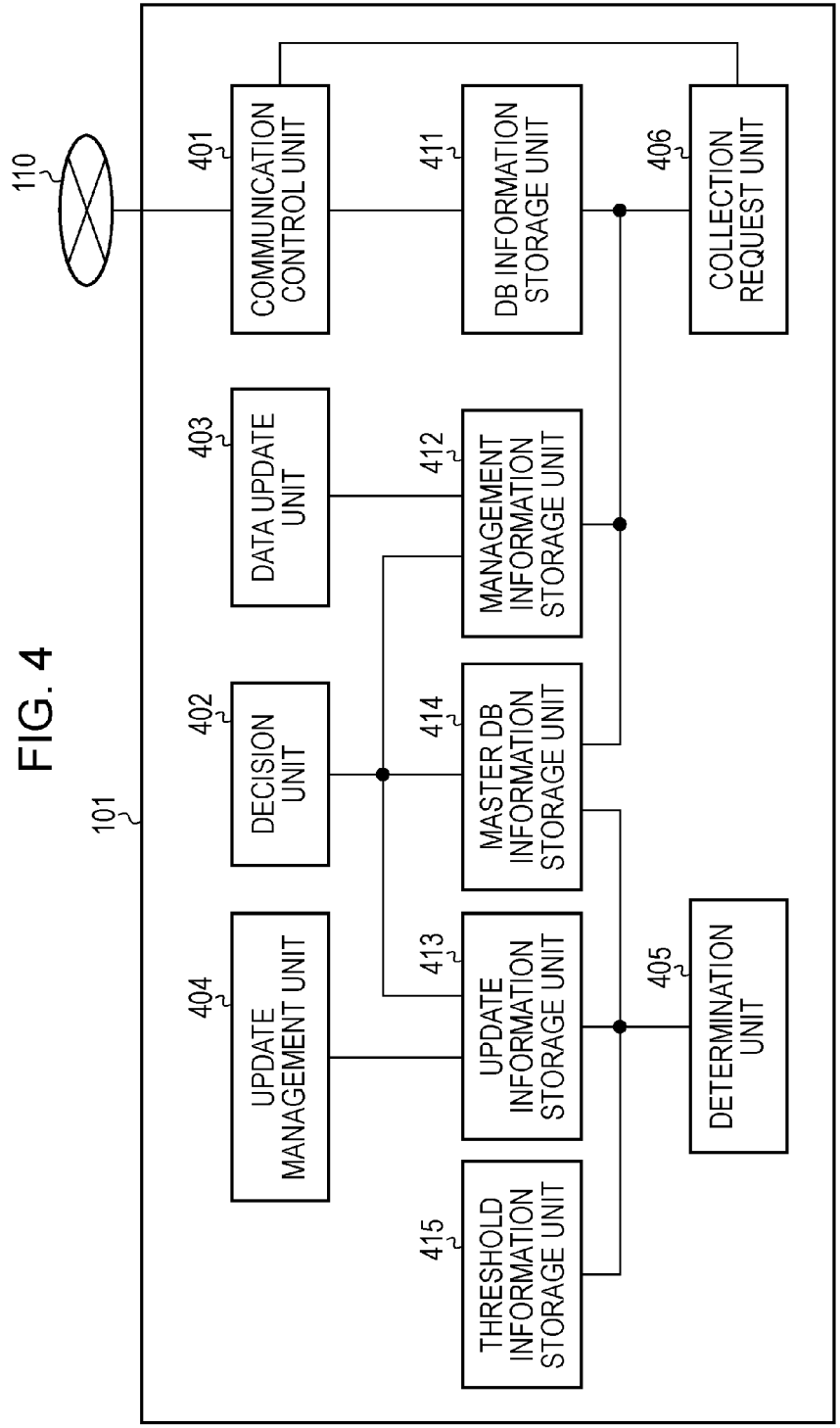

FIG. 5

| DB IDENTIFIER | DESTINATION INFORMATION | DB NAME |
|---|---|---|
| DB102(1) | Host_1 | SERVER MANAGEMENT DB |
| DB102(2) | Server_1 | STORAGE MANAGEMENT DB |
| DB102(3) | 192.168.0.3 | NETWORK MANAGEMENT DB |

FIG. 6

| GID 701 | DATA TYPE 702 | DB IDENTIFIER 703 | LID 704 | ATTRIBUTE INFORMATION 705 |
|---|---|---|---|---|
| GID_1 | SERVER | DB102(1) | LID_1 | IP=192.168.1.1 — 710 |
| GID_1 | SERVER | DB102(2) | SVR_1 | IP=192.168.1.1 — 711 |
| GID_2 | DISK | DB102(1) | LID_2 | ID=DISK_1 — 712 |
| GID_2 | DISK | DB102(2) | DISK_1 | ID=DISK_1 — 713 |
| GID_3 | VM | DB102(1) | Host=vm1 | HOST=VM_1 — 714 |
| ... | ... | ... | ... | ... |

| DB IDENTIFIER | DATA TYPE | NUMBER OF UPDATES | UPDATE DATE AND TIME | PREVIOUS UPDATE DATE AND TIME | AVERAGE UPDATE INTERVAL |
|---|---|---|---|---|---|
| DB102(1) | SERVER | 444 | 01/23/2012 09:59:07 | 01/23/2012 09:58:37 | 81 SECONDS |
| DB102(1) | DISK | 392 | 01/23/2012 09:59:07 | 01/23/2012 09:58:07 | 91 SECONDS |
| DB102(1) | VM | 373 | 01/23/2012 09:58:37 | 01/23/2012 09:58:07 | 96 SECONDS |
| DB102(2) | SERVER | 73 | 01/23/2012 09:55:26 | 01/23/2012 09:50:26 | 485 SECONDS |
| DB102(2) | DISK | 65 | 01/23/2012 09:55:26 | 01/23/2012 09:45:26 | 535 SECONDS |
| DB102(3) | SERVER | 8 | 01/23/2012 09:00:56 | 01/23/2012 07:00:56 | 4050 SECONDS |
| DB102(3) | NETWORK | 9 | 01/23/2012 09:00:56 | 01/23/2012 08:00:56 | 3600 SECONDS |

FIG. 8

| DATA TYPE | NUMBER OF UPDATES | AVERAGE UPDATE INTERVAL |
|---|---|---|
| SERVER | 100 | 120 |
| DISK | 60 | 300 |
| VM | 50 | 300 |
| NETWORK | 30 | 600 |
| ... | | |

FIG. 9

| GID | DB IDENTIFIER | DATA TYPE |
|---|---|---|
| GID_1 | DB102(1) | SERVER |
| ... | | |

FIG. 12

| 1201 | 1202 | 1203 | 1204 | 1205 |
|---|---|---|---|---|
| DB IDENTIFIER | UPDATE TYPE | DATA TYPE | LID | ATTRIBUTE INFORMATION |
| DB102(3) | REGISTRATION | SERVER | Host_A | IP=192.168.1.1 |

1210

| DB IDENTIFIER | UPDATE TYPE | DATA TYPE | LID | ATTRIBUTE INFORMATION |
|---|---|---|---|---|
| DB102(1) | UPDATE | SERVER | LID_1 | IP=192.168.1.1 |

1211

| DB IDENTIFIER | UPDATE TYPE | DATA TYPE | LID | ATTRIBUTE INFORMATION |
|---|---|---|---|---|
| DB102(1) | DELETION | DISK | LID_2 | ID=DISK1 |

| GID | DATA TYPE | DB IDENTIFIER | LID | ATTRIBUTE INFORMATION |
|---|---|---|---|---|
| GID_1 | SERVER INFORMATION | DB102(1) | LID_1 | IP=192.168.1.1 |
| GID_1 | SERVER INFORMATION | DB102(2) | SVR_1 | IP=192.168.1.1 |
| GID_1 | SERVER INFORMATION | DB102(3) | Host_A | IP=192.168.1.1 |
| GID_2 | DISK INFORMATION | DB102(1) | LID_2 | ID=DISK_1 |
| GID_2 | DISK INFORMATION | DB102(2) | DISK_1 | ID=DISK_1 |
| GID_3 | VM INFORMATION | DB102(1) | Host=vm1 | HOST=VM_1 |
| ... | ... | ... | ... | ... |

FIG. 14

| MDR-ID | DATA TYPE | NUMBER OF UPDATES | UPDATE DATE AND TIME | PREVIOUS UPDATE DATE AND TIME | AVERAGE UPDATE INTERVAL |
|---|---|---|---|---|---|
| DB102(1) | SERVER | 444 | 01/23/2012 09:59:07 | 01/23/2012 09:58:37 | 81 SECONDS |
| DB102(1) | DISK | 392 | 01/23/2012 09:59:07 | 01/23/2012 09:58:07 | 91 SECONDS |
| DB102(1) | VM | 373 | 01/23/2012 09:58:37 | 01/23/2012 09:58:07 | 96 SECONDS |
| DB102(2) | SERVER | 73 | 01/23/2012 09:55:26 | 01/23/2012 09:50:26 | 485 SECONDS |
| DB102(2) | DISK | 65 | 01/23/2012 09:55:26 | 01/23/2012 09:45:26 | 535 SECONDS |
| DB102(3) | SERVER | 9 | 01/23/2012 10:00:56 | 01/23/2012 09:00:56 | 4000 SECONDS |
| DB102(3) | NETWORK | 9 | 01/23/2012 09:00:56 | 01/23/2012 08:00:56 | 3600 SECONDS |

FIG. 20

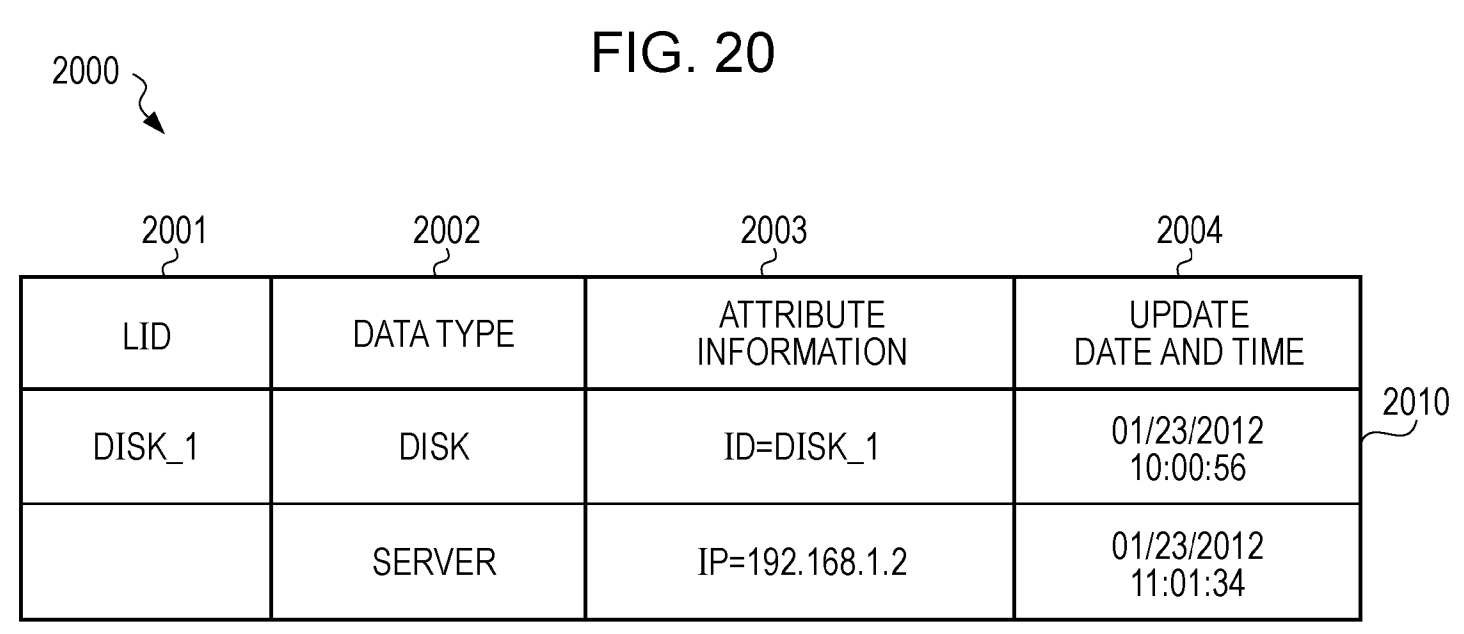

| LID | DATA TYPE | ATTRIBUTE INFORMATION | UPDATE DATE AND TIME |
|---|---|---|---|
| DISK_1 | DISK | ID=DISK_1 | 01/23/2012 10:00:56 |
|  | SERVER | IP=192.168.1.2 | 01/23/2012 11:01:34 |

COMPUTER-READABLE NON-TRANSITORY MEDIUM STORING THEREIN A CONTROL PROGRAM, MANAGEMENT APPARATUS, AND INFORMATION PROCESSING SYSTEM

CROSS-REFERENCE TO RELATED APPLICATION

This application is based upon and claims the benefit of priority from the prior Japanese Patent Application No. 2012-074420 filed on Mar. 28, 2012, the entire contents of which are incorporated herein by reference.

FIELD

The embodiment discussed herein is related to a database management technique.

BACKGROUND

In the related art, there is a technique in which a plurality of different databases (hereinafter referred to as DBs) are integrated so as to be managed as one database. For example, a technique exists in which a configuration management database (CMDB) for integrating pieces of configuration information of a system stored in a plurality of DBs, DB-1 to DB-3, and managing the configuration of the entire system is constructed.

A CMDB has a function (reconciliation function) of, when integrating pieces of information retained in databases, determining the identicalness of pieces of configuration information and merging pieces of configuration information which are determined to be the same. As for determination of the identicalness of data, data to serve as a key for determining the identicalness of data is preset from among pieces of common information retained in target databases to be integrated, and it is determined whether or not the data set as the key (or a hash value generated on the basis of the data) matches data in each database.

Now, an integration process performed in a CMDB will be described by using FIG. 21. FIG. 21 illustrates an example of constructing a CMDB by integrating three DBs which are DB-1, DB-2, and DB-3. The DB-1 stores information of IP="192.168.0.1" and NAME="name_XXX" of a device "NODE_A". The DB-2 stores information of ID="192.168.0.1" and HDD="Disk_abc" of a device "Server_1". The DB-3 stores information of IP_ADDR="192.168.0.1" and CPU_INFO="CPU A" of a device "HOST_X".

Although the DB-1, the DB-2, and the DB-3 each perform storing in their own data formats, for example, the data of "192.168.0.1" is data commonly stored in the DB-1, the DB-2, and the DB-3. In this case, it may be determined that "NODE_A", "Server_1", and "HOST_X" represent the same device. Hence, pieces of data stored in the DB-1, the DB-2, and the DB-3 are converted from their own data formats of the DB-1, the DB-2, and the DB-3 into a common data format and are integrated into the CMDB by using an ipAddress attribute as a key for integration. In this way, information of Name="name_XXX", CPU="CPU_A", and Disk="Disk_abc" of the device with ipAddress="192.168.0.1" ("SERVER_XXX" illustrated in FIG. 21) may be obtained from the CMDB.

Problems

DBs to be integrated into a CMDB each update configuration information stored therein and supply data of information changed due to updating (changed data) to the CMDB at their respective transmission intervals, thereby causing a significant time difference between old and new versions of data to be integrated in the CMDB. For example, the DB-1 in FIG. 21 transmits changed data once a minute, whereas, in some cases, the DB-2 and the DB-3 transmit changed data once a day.

When a process of integrating data is performed in the CMDB in this situation, configuration information in which a change has been reflected has already been obtained from a DB, whereas configuration information in which a change has been reflected has not yet been obtained from another DB, thereby resulting in integrated data having a mixture of old data and new data in some cases. When system settings are set by using such integrated data exhibiting inconsistencies, an application executed as a component of a system may malfunction.

SUMMARY

According to an aspect of the invention, a computer-readable, non-transitory medium storing therein a control program that causes a management apparatus to execute an operation, the operation comprises specifying, from among a plurality of databases, a database with the highest frequency of update of target data to be integrated which is stored in the database, transmitting, in accordance with acquisition of update data from the specified database, to a database other than the specified database among the plurality of databases, a request to transmit information stored in the database other than the specified database to the management apparatus and updating the target data to be integrated on the basis of the information transmitted to the management apparatus by the database other than the specified database in accordance with the request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a hardware configuration of a CMDB management apparatus;
FIG. 3 illustrates an example of a hardware configuration of a DB management device;
FIG. 4 is a functional block diagram of the CMDB management apparatus;
FIG. 5 illustrates DB management information;
FIG. 6 illustrates management information;
FIG. 7 illustrates update information;
FIG. 8 illustrates threshold information;
FIG. 9 illustrates master DB information;
FIG. 12 illustrates update request information;
FIG. 13 illustrates management information;
FIG. 14 illustrates update information.

FIG. 20 illustrates update date and time information; and

DESCRIPTION OF EMBODIMENT

An embodiment will be described with reference to the drawings.

Figure 1:
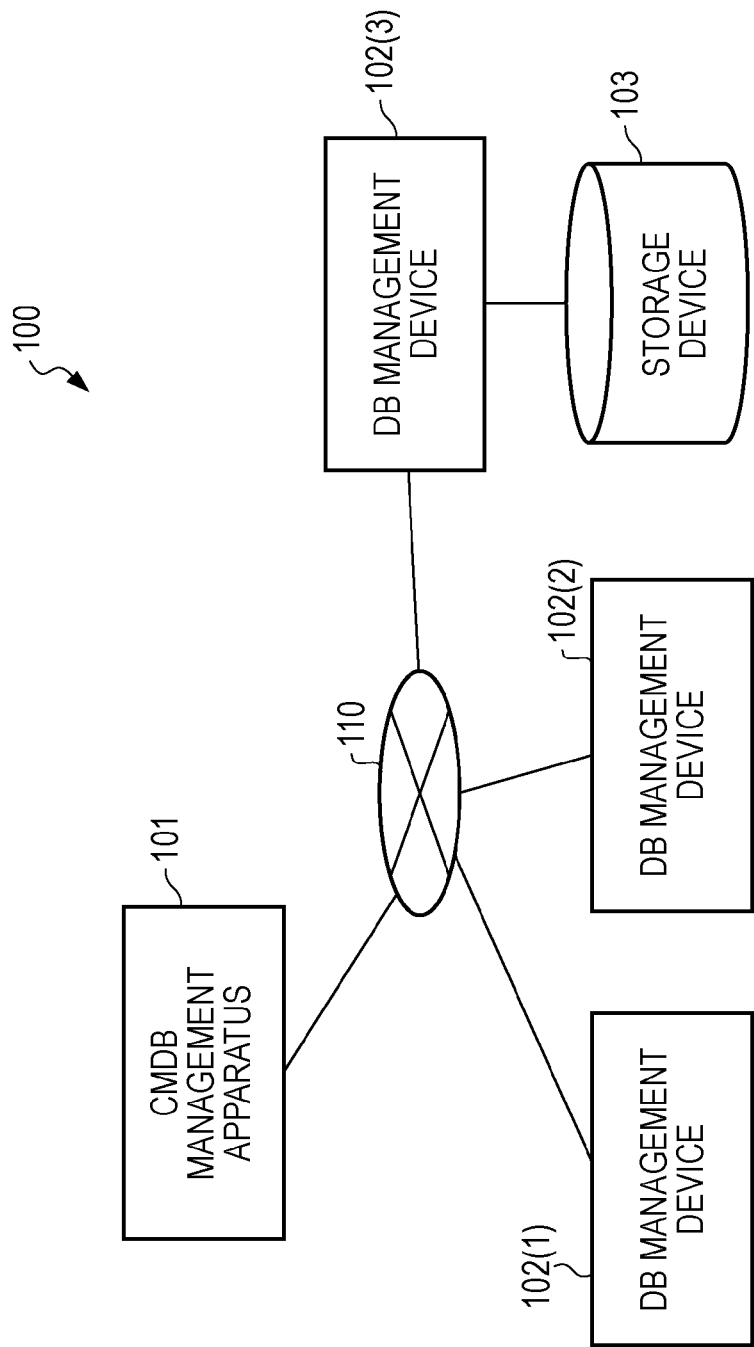
FIG. 1 illustrates a DB system.

The embodiment may be implemented with, for example, a DB system 100 illustrated in FIG. 1. The DB system 100 illustrated in FIG. 1 includes a CMDB management apparatus 101 in which a plurality of DBs are integrated, and DB management devices 102(1) to 102(3) which correspond to target DBs to be integrated by the CMDB management apparatus 101. The CMDB management apparatus 101 and the DB management devices 102(1) to 102(3) are connected to one another via a network 110 in such a manner as to be able to communicate with one another. The CMDB management apparatus 101 and the DB management devices 102(1) to 102(3) may be server devices for storing data. The DB management devices 102(1) to 102(3) may store data in, for example, storage devices connected thereto, like in the case of a storage device 103 connected to the DB management device 102(3) in FIG. 1. Also, for example, the DB management devices 102(1) to 102(3) may be implemented as one server device. In the embodiment, the DB system 100 has three DB management devices which are the DB management devices 102(1) to 102(3); however, the number of DB management devices and the number of DBs implemented by DB management devices are not limited to this number.

FIG. 2 illustrates a hardware configuration of the CMDB management apparatus 101. The CMDB management apparatus 101 includes a central processing unit (CPU) 201, a random access memory (RAM) 202, a hard disk drive (HDD) 203, a drive 204, and an adapter 206, which are connected to one another via a bus in such a manner as to be able to communicate with one another. The CPU 201 performs arithmetic processing or the like to be performed by the CMDB management apparatus 101. Data, for example, which is used for the arithmetic processing performed by the CPU 201 is loaded into the RAM 202. Information which the CMDB management apparatus 101 stores as a DB is stored in the HDD 203. The HDD 203 may be a storage device other than an HDD, such as a semiconductor storage device or magnetic tape storage device. The drive 204 is a reader which is capable of reading information stored in, for example, a disk read only memory (ROM) 205 and loading the information into the RAM 202. The adapter 206 is a connection device for connecting the CMDB management apparatus 101 to the network 110.

FIG. 3 illustrates a hardware configuration of the DB management device 102(1). The DB management device 102(1) includes a CPU 301, a RAM 302, an HDD 303, a drive 304, and an adapter 306, which are connected to one another via a bus in such a manner as to be able to communicate with one another. The CPU 301 performs arithmetic processing to be performed by the DB management device 102(1). Data, for example, which is used for the arithmetic processing performed by the CPU 301 is loaded into the RAM 302. Information which the DB management device 102(1) stores as a DB is stored in the HDD 303. The HDD 303 may be a storage device other than an HDD, such as a semiconductor storage device or magnetic tape storage device. The drive 304 is a reader which is capable of reading information stored in, for example, a disk ROM 305 and loading the information into the RAM 302. The adapter 306 is a connection device for connecting the DB management device 102(1) to the network 110. The DB management devices 102(2) and 102(3) may have a similar hardware configuration to the DB management device 102(1) illustrated in FIG. 3.

FIG. 4 is a functional block diagram of the CMDB management apparatus 101. The CMDB management apparatus 101 has a communication control unit 401, a decision unit 402, a data update unit 403, an update management unit 404, a determination unit 405, and a collection request unit 406. In addition, the CMDB management apparatus 101 has a DB information storage unit 411, a management information storage unit 412, an update information storage unit 413, a master DB information storage unit 414, and a threshold information storage unit 415.

The communication control unit 401, the decision unit 402, the data update unit 403, the update management unit 404, the determination unit 405, and the collection request unit 406 may be implemented by, for example, the CPU 201 executing a program stored in the HDD 203. Alternatively, the program which the CPU 201 executes may be stored in the disk ROM 205 and read by the drive 204. The DB information storage unit 411, the management information storage unit 412, the update information storage unit 413, the master DB information storage unit 414, and the threshold information storage unit 415 may also be implemented by using the HDD 203 or the RAM 202.

Here, content stored in the DB information storage unit 411 will be described in more detail. The CMDB management apparatus 101 stores information for identifying three DBs, managed by the DB management devices 102(1) to 102(3), as target DBs to be integrated. For example, the CMDB management apparatus 101 stores DB management information 600 illustrated in FIG. 5 in the DB information storage unit 411.

The DB management information 600 illustrated in FIG. 5 includes information of a DB identifier 601, destination information 602, and a DB name 603.

The DB identifier 601 contains identifiers for identifying the DB management devices 102(1) to 102(3). In FIG. 5, an identifier of the DB management device 102(1) is expressed as "DB 102(1)", an identifier of the DB management device 102(2) is expressed as "DB 102(2)", and an identifier of the DB management device 102(3) is expressed as "DB 102(3)". As the DB identifier 601, for example, a world wide name (WWN) or an identification number preset by an administrator of the DB system 100 may also be used.

The destination information 602 is information specifying a destination to be connected to when the CMDB management apparatus 101 is connected to each of the DB management devices 102(1) to 102(3). As illustrated in FIG. 5, the destination information 602 may be expressed as a host name of "host name =Host_1", a server name of "server name =Server_1", an Internet protocol (IP) address of "IP address =192.168.0.3", or the like.

The DB name 603 is information representing respective set names of the DB management devices 102(1) to 102(3). The DB name 603 may contain, for example, respective names, assigned by the administrator of the DB system 100 to the DB management devices 102(1) to 102(3). In the embodiment, "server management DB", "storage management DB", and "network management DB" in the DB name 603 are respectively assigned to the DB management devices 102(1), 102(2), and 102(3) by the administrator of the DB system 100.

An example of DB information in FIG. 5 will be described. The CMDB management apparatus 101 may specify, on the basis of DB information 610, the DB management device 102(1) identified by one of the identifiers of target DBs to be integrated which are included in the DB information 610, "Host_1" as destination information, and "server management DB" as the DB name of the DB management device 102(1).

Next, content stored in the management information storage unit 412 will be described.

FIG. 6 illustrates an example of content stored in the management information storage unit 412 and defines which data is to be integrated with which data. The CMDB management apparatus 101 may integrate pieces of information stored in the DB management devices 102(1) to 102(3) on the basis of management information 700.

In this example, the management information 700 includes a global identifier (GID) 701, a data type 702, a DB identifier 703, a local identifier (LID) 704, and attribute information 705.

The GID 701 is an identifier for uniquely identifying data in the CMDB management apparatus 101.

The data type 702 is information specifying what information data relates to.

The DB identifier 703 is an identifier for identifying each of the DB management devices 102(1) to 102(3). Description of the DB identifier 703 may be similar to that of the foregoing DB identifier 601.

The LID 704 is an identifier for uniquely identifying data in each of the DB management devices 102(1) to 102(3).

The attribute information 705 represents information, among pieces of information stored in the DB management devices 102(1) to 102(3), used as a key for integrating data. For example, FIG. 6 illustrates that data of LID_1 of the DB management device 102(1) specified by management information 710 and data of SVR_1 of the DB management device 102(2) specified by management information 711 are to be integrated by using IP address=192.168.1.1 of the attribute information 705 as a key. FIG. 6 also illustrates that data of LID_2 of the DB management device 102(1) specified by management information 712 and data of DISK_1 of the DB management device 102(2) specified by management information 713 are to be integrated by using ID=DISK_1 of the attribute information 705 as a key.

The CMDB management apparatus 101 may store update information 800 illustrated in FIG. 7 in the update information storage unit 413.

FIG. 7 illustrates an example of the update information 800 concerning updating of data stored in each of the DB management devices 102(1) to 102(3). The update information 800 includes, for example, a DB identifier 801, a data type 802, the number of updates 803, an update date and time 804, a previous update date and time 805, and an average update interval 806.

The DB identifier 801 is an identifier for identifying a DB. Description of the DB identifier 801 may be similar to that of the foregoing DB identifier 601. The data type 802 is information specifying a type of data. The number of updates 803 is information representing the cumulative number of times data has been updated in the CMDB management apparatus 101. The update date and time 804 is information specifying a date and time when the latest update was performed. The previous update date and time 805 is information specifying a date and time when an update one update prior to the update performed on the date and time listed in the update date and time 804 was performed. The average update interval 806 is an index of the frequency of update calculated on the basis of actual past updates.

In the embodiment, one of the DB management devices 102(1) to 102(3) with the highest frequency of update is specified on the basis of the respective frequencies of update in the DB management devices 102(1) to 102(3) included in the DB system 100. Now, in the embodiment, update information stored by the update information storage unit 413 is utilized.

The decision unit 402 in the CMDB management apparatus 101 specifies, on the basis of the update information 800, a DB which stores data with the highest frequency of update for each GID 701 and data type 702.

First, the decision unit 402 detects a data type and a DB identifier which correspond to GID_1 with reference to the management information 700 in FIG. 6. In this example, the CMDB management apparatus 101 detects that the data type corresponding to GID_1 is "server" and further detects two DB identifiers representing the DB management devices 102(1) and 102(2).

Then, the decision unit 402 obtains, with reference to the update information 800 in FIG. 7, an average update interval of data in a DB identified by the DB identifier representing the DB management device 102(1) or 102(2) and the data type "server". In this example, "81 seconds" and "485 seconds" are obtained.

In addition, the decision unit 402 similarly obtains average update intervals of "91 seconds" and "535 seconds" for GID_2.

Then, the decision unit 402 decides upon a DB with the highest frequency of update on the basis of the obtained average update intervals. In this case, as for GID_1, the DB management device 102(1) corresponding to "81 seconds", which is the smallest value among "81 seconds" and "485 seconds" is specified (as a master DB).

As for GID_2, the DB management device 102(1) corresponding to "91 seconds", which is the smallest value among "91 seconds" and "535 seconds" is specified as a master DB.

Here, as a criterion for selecting a master DB, a condition that an update interval be shorter than a certain reference may additionally be added. It is possible to suppress performance of a process demanding real time performance by performing a process which will be described below even when an update interval is longer. In this case, the decision unit 402 may refer to a certain threshold stored in the threshold information storage unit 415, additionally add a condition that an average update interval be shorter than the certain threshold, and decide upon a master DB. Also, the number of updates may be added to threshold information, thereby performing threshold determination by using an average update interval in a stable situation in which a certain number of updates have been performed.

FIG. 8 illustrates an example of a data structure of threshold information 1000 stored in the threshold information storage unit 415. The threshold information 1000 may be, for example, a data table in which the number of updates 1002 and an average update interval 1003 are associated with a data type 1001. The data type has, for example, the threshold information 1010, 1011, 1012 regarding to SERVER, DISK, Virtual Machine as the data type 1001. For example, the threshold information 1000 represents that the number of updates is set to be 100 times or more and the average update interval is set to be within 120 seconds as thresholds of data of the data type "server". In the case where a master DB is decided upon on the basis of the threshold information 1000, when an update interval of a DB with the highest frequency of update is shorter than a threshold, the decision unit 402 may decide upon this DB as the master DB. When the number of updates of a DB with the highest frequency of update exceeds a threshold and an update interval thereof is shorter than a threshold, the decision unit 402 may decide upon this DB as the master DB and store the DB in the master DB information storage unit 414.

In the foregoing example, thresholds corresponding to update information 810 are the number of updates of 100 times and the average update interval of 120 seconds. On the basis of the update information 810, the number of updates of server information in the DB management device 102(1) is 444 times and exceeds a threshold of 100 times. In addition, the average update interval of the server information in the DB management device 102(1) is 81 seconds and is below a threshold of 120 seconds. Thus, because the conditions utilizing the thresholds set in threshold information 1010 are satisfied, the DB management device 102(1) is decided upon as the master DB and is stored in the master DB information storage unit 414. For example, data stored in the master DB information storage unit 414 may be master DB information 900 illustrated in FIG. 9. The DB information 900 has, for example, information of GID, DB 901 Identifier 902 and data type 903 information.

In the embodiment, the foregoing process performed by the decision unit 402 is performed, for example, at regular intervals and decision may be dynamically made in accordance with changes in the respective frequencies of update of data stored in the DB management devices 102(1) to 102(3).

Figure 10:
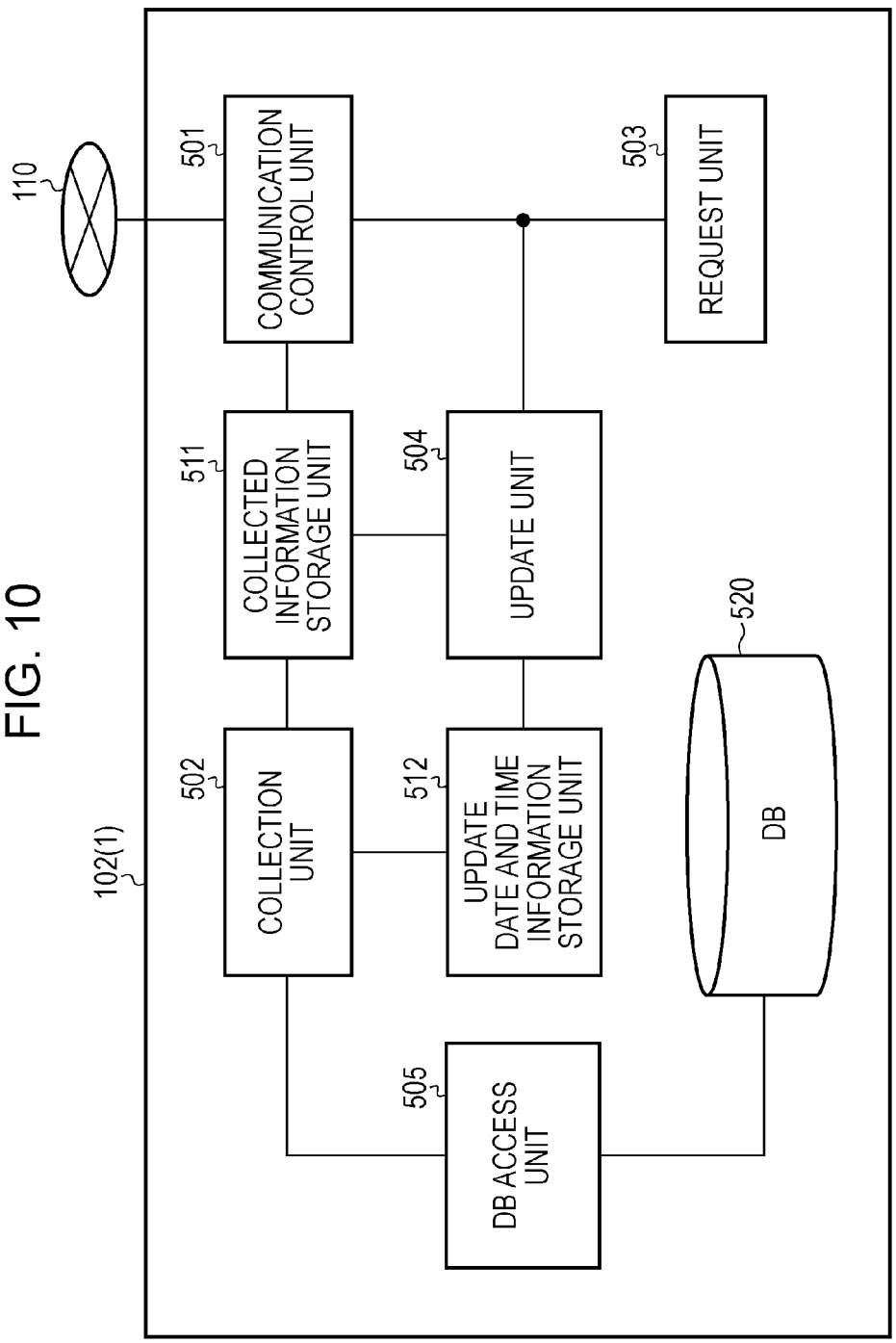
FIG. 10 is a functional block diagram of the DB management device.

FIG. 10 is a functional block diagram of the DB management device 102(1). The DB management device 102(1) has a communication control unit 501, a collection unit 502, a request unit 503, an update unit 504, and a DB access unit 505. In addition, the DB management device 102(1) has a collected information storage unit 511 a update date and time information storage unit 512 and a DB 520.

The communication control unit 501, the collection unit 502, the request unit 503, the update unit 504, and the DB access unit 505 may be implemented by, for example, the CPU 301 executing a program stored in the HDD 303. Alternatively, the program which the CPU 301 executes may be stored in the disk ROM 305 and may be read by the drive 304. The collected information storage unit 511 and the DB 520 may be implemented by using the HDD 303 or the RAM 302. The DB 520 may be implemented by using a storage device, like the storage device 103 in FIG. 1, connected to the DB management device 102(1). In this case, the DB management device 102(1) may access the storage device connected to the DB management device 102(1) via the DB access unit 505 or the communication control unit 501. Functional units and storage units included in the DB management devices 102(2) and 102(3) may have a similar functional configuration to those in the DB management device 102(1) illustrated in FIG. 10.

Figure 11:
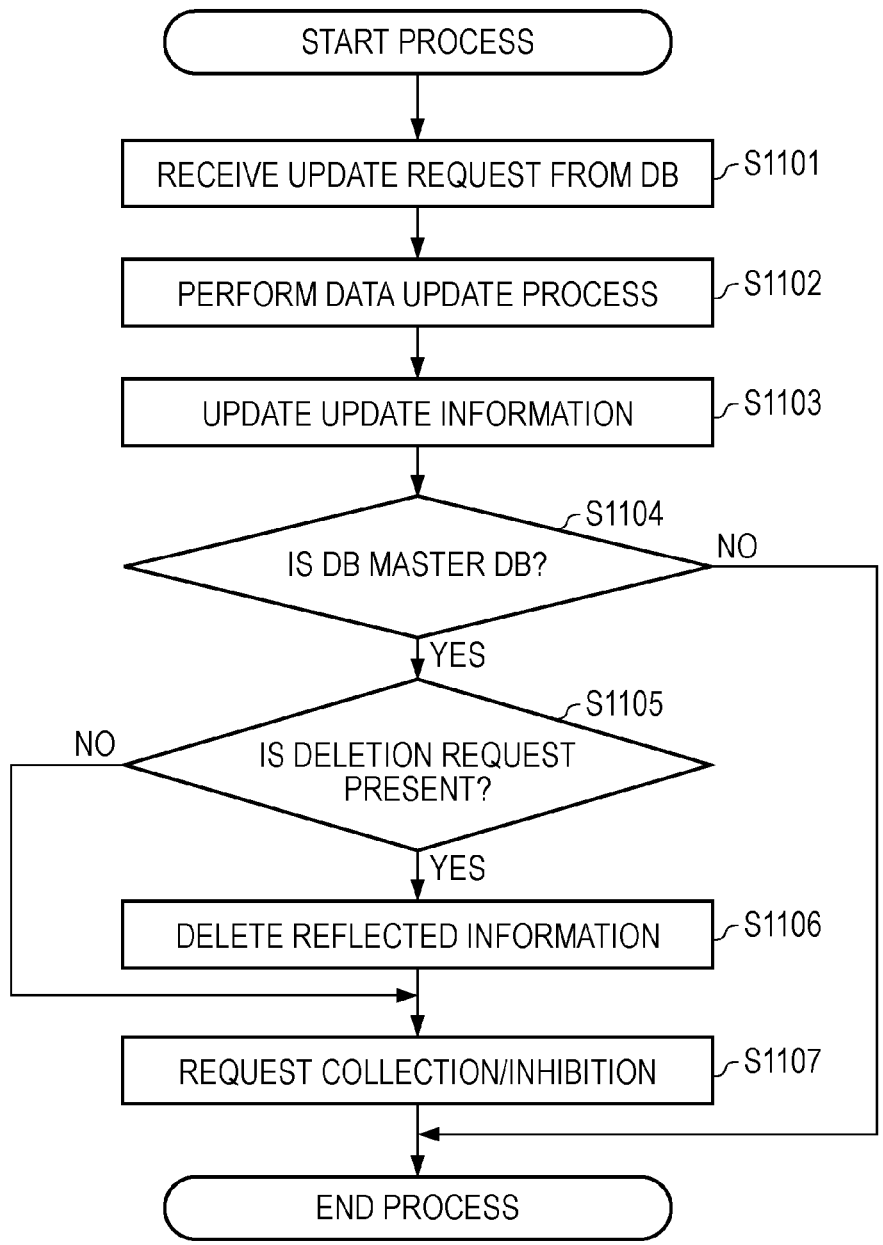
FIG. 11 is a flowchart illustrating a procedure of a process performed by the CMDB management apparatus.

Here, a process performed by the CMDB management apparatus 101 according to the embodiment will be described. FIG. 11 is a flowchart illustrating a procedure of the process performed by the CMDB management apparatus 101.

First, the CMDB management apparatus 101 receives update requests transmitted by the DB management devices 102(1) to 102(3) at their respective intervals (timings) via the communication control unit 401 (step S1101). The data update unit 403 updates the management information 700 on the basis of the update requests received by the communication control unit 401 (step S1102).

After the process of step S1102 has been performed, the update management unit 404 updates the update information 800 (step S1103).

After the process of step S1103 has been performed, the determination unit 405 determines whether or not a DB from which each of the update requests has been transmitted is a DB decided upon as the master DB (step S1104). For example, the determination unit 405 refers to a DB identifier 902 included in the master DB information 900 in FIG. 9 stored in the master DB information storage unit 414 and, when a DB identifier of a DB from which each of the update requests has been transmitted matches the DB identifier 902, determines that the DB from which the update request has been transmitted is the master DB. Furthermore, the foregoing process of deciding upon the master DB may be performed by the decision unit 402 in step S1104. When the determination unit 405 determines that the DB from which the update request has been transmitted is not the master DB, the CMDB management apparatus 101 ends the update process illustrated in FIG. 11.

On the other hand, when the determination unit 405 determines that the DB from which the update request has been transmitted is the master DB in step S1104, the determination unit 405 determines whether or not data which is requested to be deleted is present in the update request information received by the communication control unit 401 in step S1101 (step S1105). When the determination unit 405 determines that data which is requested to be deleted is present in the received update request information, the data update unit 403 deletes data integrated with the data which is requested to be deleted from the management information 700 (step S1106). Specifically, the data update unit 403 deletes data associated with a target GID to be deleted. After deletion of data has been performed, a process of step S1107 is performed.

On the other hand, when the determination unit 405 determines that data which is requested to be deleted is not present in the update request information received in step 51105, the data update unit 403 does not perform the process of step S1106 and proceeds to the process of step S1107.

The collection request unit 406 transmits a request for collection of data to the DB management devices including the DBs other than the master DB in step S1107, so that the other DBs are updated in accordance with the DB with the highest frequency of update. When deletion is performed in step S1106, an inhibition request including an LID corresponding to the deleted GID is transmitted to the corresponding DB management device including the DBs other than the master DB, so that unwanted changed data related to the GID for the already deleted configuration in the latest information is not transmitted to the CMDB management apparatus 101.

As described above, the CMDB management apparatus 101 collects data to be updated from the other DBs in accordance with reception of an update request from the master DB to the CMDB management apparatus 101, thereby allowing occurrence of inconsistencies in data due to delay in updating to be suppressed even when a plurality of DBs with different transmission intervals of an update request are subjected to an integration process of data.

In the above, the flow of the integration process has been described. Now, an additional example of the foregoing process of steps S1101 and S1102 will be described.

FIG. 12 illustrates update request information which each DB management device transmits to the CMDB management apparatus 101 when requesting an update. In this example, update request information is illustrated for when the DB management device 102(3) transmits update request information 1210, and when the DB management device 102(1)

transmits update request information 1211 and additionally transmits update request information 1212, in sequence.

The update request information may include a DB identifier 1201, an update type 1202, a data type 1203, an LID 1204, and attribute information 1205. Description of the DB identifier 1201, the data type 1203, the LID 1204, and the attribute information 1205 may be similar to that of the foregoing DB identifier 601, data type 702, LID 704, and attribute information 705, respectively.

The update type 1202 is information representing content of an update. The update type will be described in detail. "Registration" is an update type representing addition of new information to the CMDB management apparatus 101 and the management information 700. "Update" is an update type representing updating of data registered in the CMDB management apparatus 101. "Deletion" is an update type representing deletion of data registered in the CMDB management apparatus 101. For example, as for the update request information 1210, it is requested that data, stored in the DB management device 102(3), specified by Host_A be integrated (registered) by using IP address ="192.168.1.1" as a key.

For example, when the communication control unit 401 receives the update request information 1210 in FIG. 12 in step S1101, the data update unit 403 refers to the management information 700 and integrates the data specified by Host_A in the DB management device 102(3) into the management information 710 and 711 of GID_1 of the attribute information 705 of IP address ="192.168.1.1". FIG. 13 illustrates an example of a management table after this process has been performed. As illustrated in FIG. 13, it is found that management information 715 for GID_1 is newly added to management information 700b.

Next, an example of the process of step S1103 will be described. As described above, the update management unit 404 updates information stored in the update information 800 in step S1103.

Specifically, the update management unit 404 performs the following processes on the update information 800 stored in the update information storage unit 413. When information is not stored in the DB identifier 801 and the data type 802, a DB identifier and a data type are stored. A value of the number of updates 803 is updated. The previous update date and time 805 is updated by using information stored in the update date and time 804. A current date and time is stored as the update date and time 804. An average update interval is recalculated and the calculated value is stored in the average update interval 806. An average update interval is defined by, for example, "{current average update interval×(number of updates−1)+ (update date and time−previous update date and time)}÷ (number of updates)".

A specific example will be given. When the update request information 1210 in FIG. 12 is received, the corresponding update information is update information 815 because DB identifier=DB management device 102(3) and data type=server. Hence, the update management unit 404 increments a value of the number of updates 803 included in the update information 815 from "8" to "9". The date and time of "01/23/2012 09:00:56" recorded in the update date and time 804 is stored in the previous update date and time 805. In addition, a current date and time is stored in the update date and time 804. For example, when a current date and time is "01/23/2012 10:00:56", this value is stored in the update date and time 804. Furthermore, an average update interval is calculated and a value of the average update interval is updated. In this case, the average update interval is {4050× (9−1)+(1327280456−1327276856)}÷9=(32400+3600)÷9=4000 (seconds).

The value of "1327280456" is a value obtained by converting the date and time of "01/23/2012 10:00:56" into an elapsed number of seconds from "01/01/1970 00:00:00", which are called epoch seconds. The value of "1327276856" is a value obtained by converting the date and time of "01/23/2012 09:00:56" into epoch seconds. For convenience of explanation, in FIG. 7, the update date and time 804 is indicated by using a date and a time like "01/23/2012 09:00:56"; alternatively, the update date and time 804 may be stored in a data format of epoch seconds.

FIG. 14 illustrates an example of update information after updating has been performed by the foregoing processes. FIG. 14 indicates that the update information 815 has been updated to update information 815b in update information 800b.

Lastly, an example of the process of step S1107 in FIG. 11 will be described. First, the collection request unit 406 obtains, with reference to the management information 700 illustrated in FIG. 6, a DB identifier and an LID corresponding to a target GID which has been updated. For example, when updating is performed on the basis of the update request information 1211 in FIG. 12, an update target is GID_1 for which a DB identifier represents the DB management device 102(1), attribute information is IP=192.168.1.1, and a data type is "server". The collection request unit 406 therefore obtains, with reference to the management information 700 illustrated in FIG. 6, another DB identifier and another LID for which a GID is GID_1 and a data type is "server". That is, the collection request unit 406 obtains DB 102(2) and SVR_1.

Then, destination information corresponding to the DB management device 102(2) is obtained with reference to the DB management information 600 illustrated in FIG. 5. In this example, Server_1 is obtained as the destination.

Figure 15:
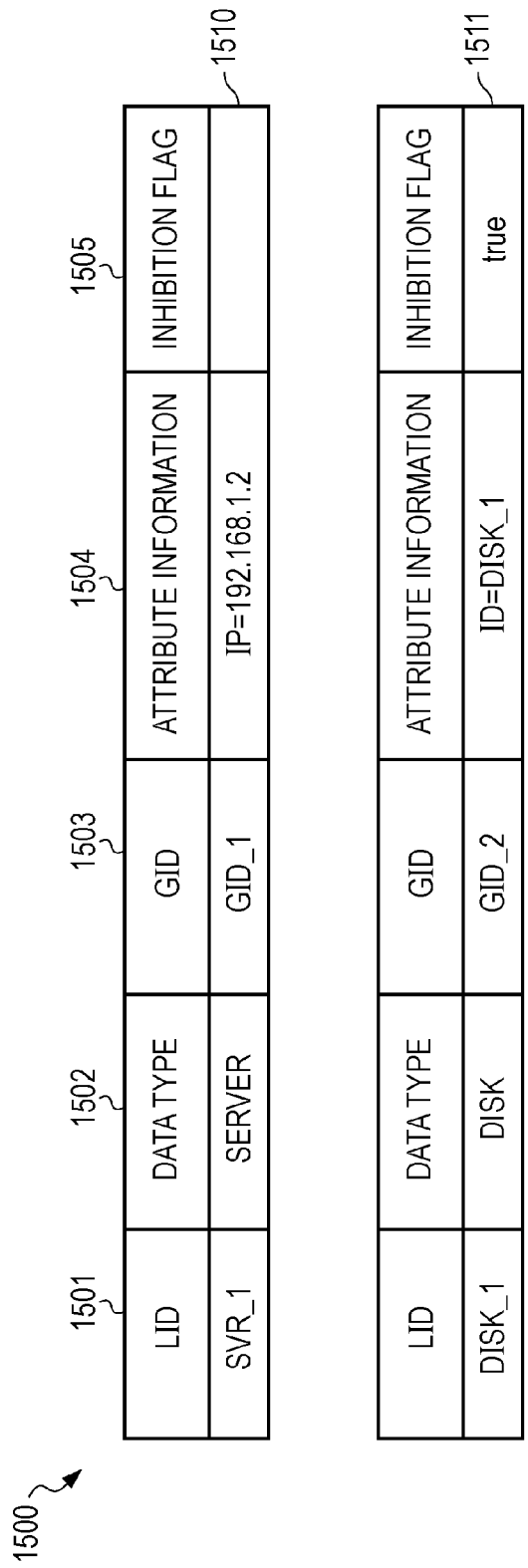
FIG. 15 illustrates collection request information.

Hence, the collection request unit 406 generates collection request information 1500 illustrated in FIG. 15 and transmits the collection request information 1500 to the Server_1. An address of the Server_1 may be obtained by accessing a domain name system (DNS) server or the like; alternatively, the destination information in FIG. 5 may serve as an IP address and the address may thereby be obtained without address resolution by accessing the DNS server or the like.

In FIG. 15, collection request information 1510 includes an LID, a data type, a GID, and attribute information. However, as long as a target record to be collected is specified, for example, it may be sufficient for only the LID to be included, thereby specifying a target record to be collected.

The collection request information 1510 may further include an inhibition flag. For example, when deletion is performed in step S1106 in FIG. 11, the collection request unit 406 may set an inhibition flag 1505 of collection request information (write "true" to a data part corresponding to the collection request information) like in collection request information 1511 in FIG. 15 and make a request to inhibit collection. The DB management devices 102(1) to 102(3) which have received collection request information to which an inhibition flag was appended perform inhibition control so that a change for the corresponding configuration is not transmitted to the CMDB management apparatus 101.

In the embodiment, when an inhibition flag is appended, the value of "true" is appended; alternatively, a value of a specific inhibition flag may be a value, such as "1" or "on", other than "true".

The collection request unit 406 which has generated collection request information transmits the generated collection request information to the DB management devices 102(1) to 102(3) corresponding to DB identifiers via the communication control unit 401.

On the other hand, the DB management devices 102(1) to 102(3) which have received the collection request information each perform a process on the basis of a collection request received by the communication control unit 501. The detail of the process will be described by using FIG. 16.

Figure 16:
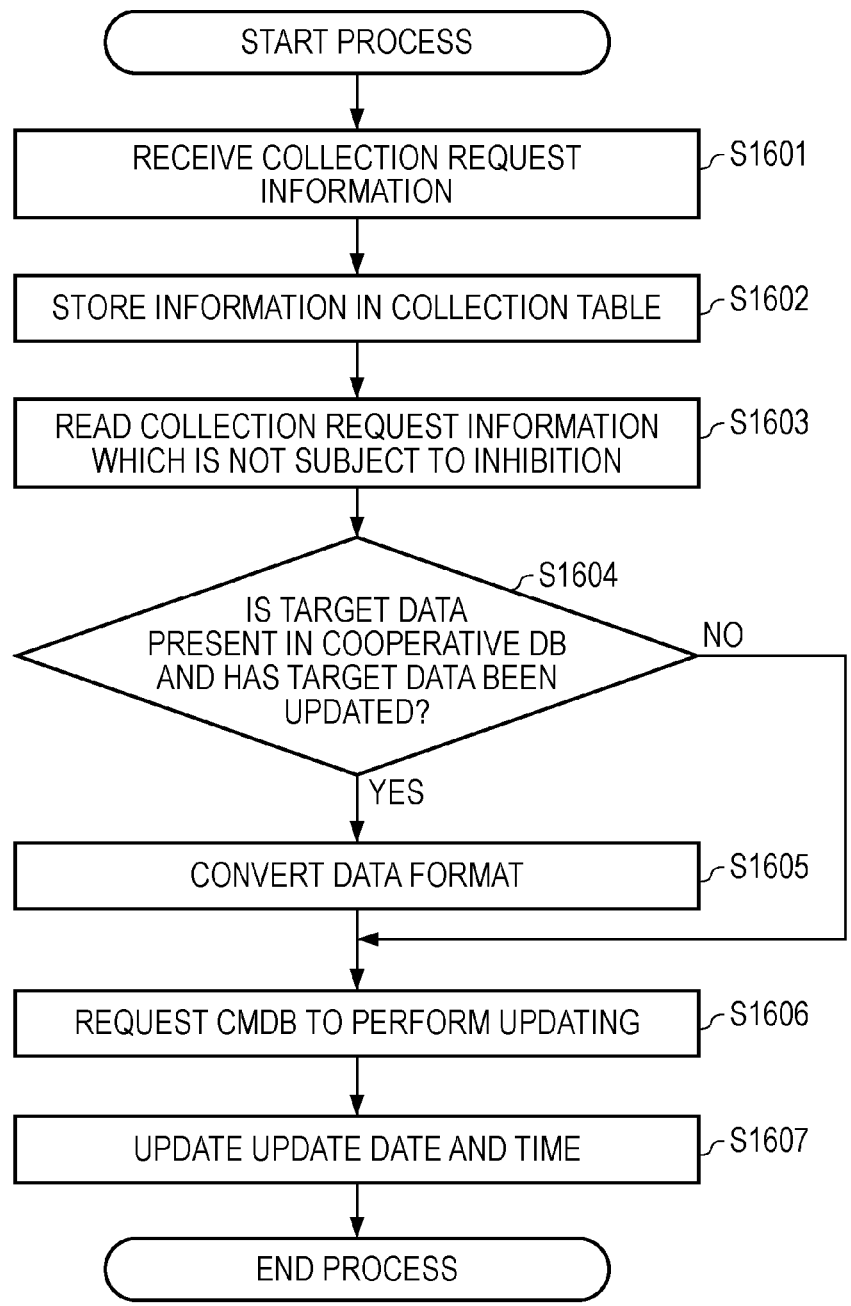
FIG. 16 is a flowchart illustrating a procedure of a process performed by each of DB management devices which has received a collection request transmitted by the CMDB management apparatus.

FIG. 16 illustrates a procedure of a process performed by each of the DB management devices 102(1) to 102(3) when the communication control unit 501 receives the collection request transmitted by the CMDB management apparatus 101.

Figure 17:
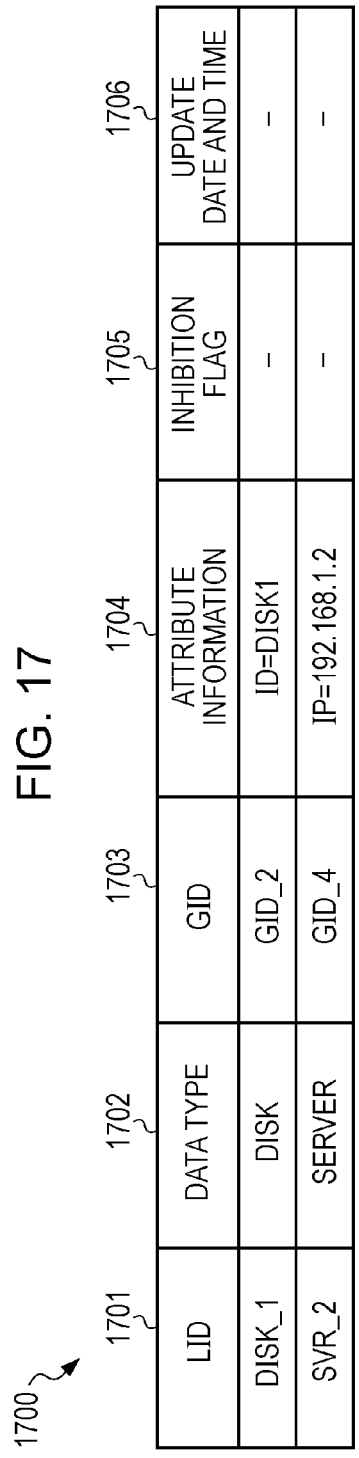
FIG. 17 illustrates collected information.

First, the communication control unit 501 receives a collection request transmitted by the CMDB management apparatus 101 (step S1601). Then, the communication control unit 501 stores information in the collected information storage unit 511 on the basis of the received collection request information (step S1602). FIG. 17 illustrates an example of the information stored by the collected information storage unit 511. Collected information 1700 in FIG. 17 includes, as information, an LID 1701, a data type 1702, a GID 1703, attribute information 1704, an inhibition flag 1705, and an update date and time 1706. The LID 1701, the data type 1702, the GID 1703, the attribute information 1704, and the inhibition flag 1705 are information of an LID 1501, a data type 1502, a GID 1503, attribute information 1504, and the inhibition flag 1505 which have been extracted from the received collection request information by the communication control unit 501 and stored in the collected information storage unit 511.

The collection unit 502 reads collection request information which is not subject to inhibition and has an inhibition flag of not true with reference to the collected information 1700 stored in the collected information storage unit 511 (step S1603). Target collection request information to be inhibited is not read here, thereby allowing unwanted changed data not to be transmitted to the CMDB management apparatus 101. Also, when changed data is to be periodically transmitted from each DB, target changed data to be inhibited is not transmitted, so that transmission of unwanted changed data to the CMDB management apparatus 101 may be suppressed.

The collection unit 502 refers to the taken collected information 1700 and retrieves target data from the DB 520 on the basis of, for example, the LID 1701 or the attribute information 1704 included in the information. When the target data is present in the DB 520 and has been updated since previous collection (Yes in step S1604), the target data is converted into a common data format recognizable by the CMDB management apparatus 101 (step S1605). Here, conversion rules of the common data format are, for example, defined in advance in respective programs executed by the DB management devices 102(1) to 102(3) whose pieces of data are integrated by the CMDB management apparatus 101. The DB management devices 102(1) to 102(3) convert target data into the common data format on the basis of the conversion rules defined in the respective programs.

When the target data is not retrieved from the DB 520 or has not been updated since previous collection, performance of conversion in step S1605 may be omitted.

Subsequently, the request unit 503 transmits the changed data which has been converted into the common data format to the CMDB management apparatus 101 and thereby requests the CMDB management apparatus 101 to reflect the update (step S1606).

After the update request has been transmitted to the CMDB management apparatus 101, the update unit 504 may update a value of the update date and time 1706 in the collected information 1700, which is a collection table, to a current date and time (step S1607).

Alternatively, the update unit 504 may update a value of the update date and time 1706 in the collection table to the date and time when the communication control unit 501 received the collection request information in step S1601.

Figure 18:
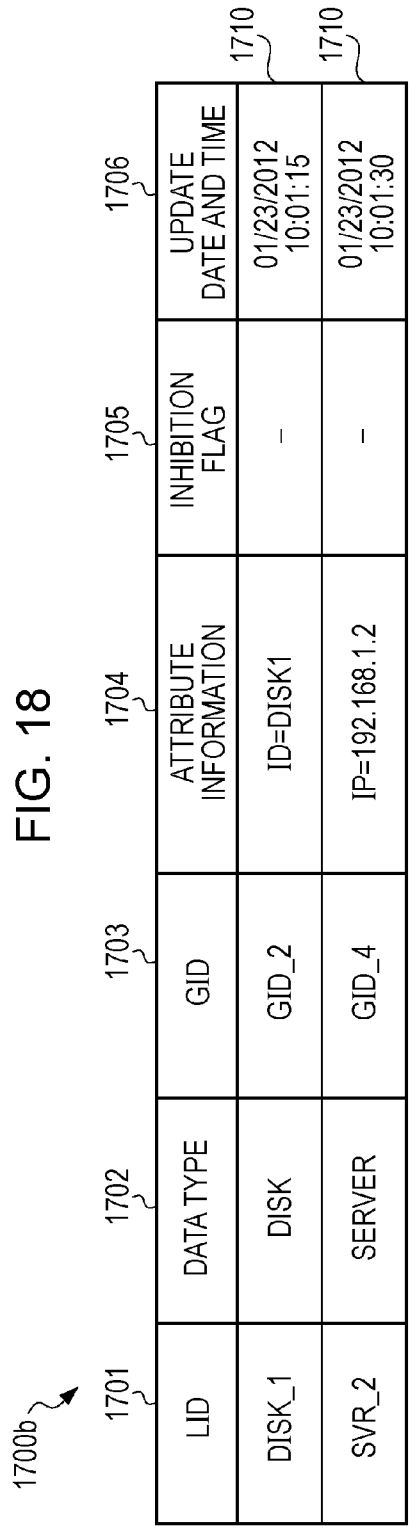
FIG. 18 illustrates collected information.

FIG. 18 illustrates an example of collected information 1700b after the collected information 1700 has been updated. As illustrated in FIG. 18, information specifying a date and time is stored in the update date and time 1706 by the process of step S1607.

When collected information which has not been processed has been stored in the collected information storage unit 511, the collection unit 502 repeats the processes from step S1603.

Figure 19:
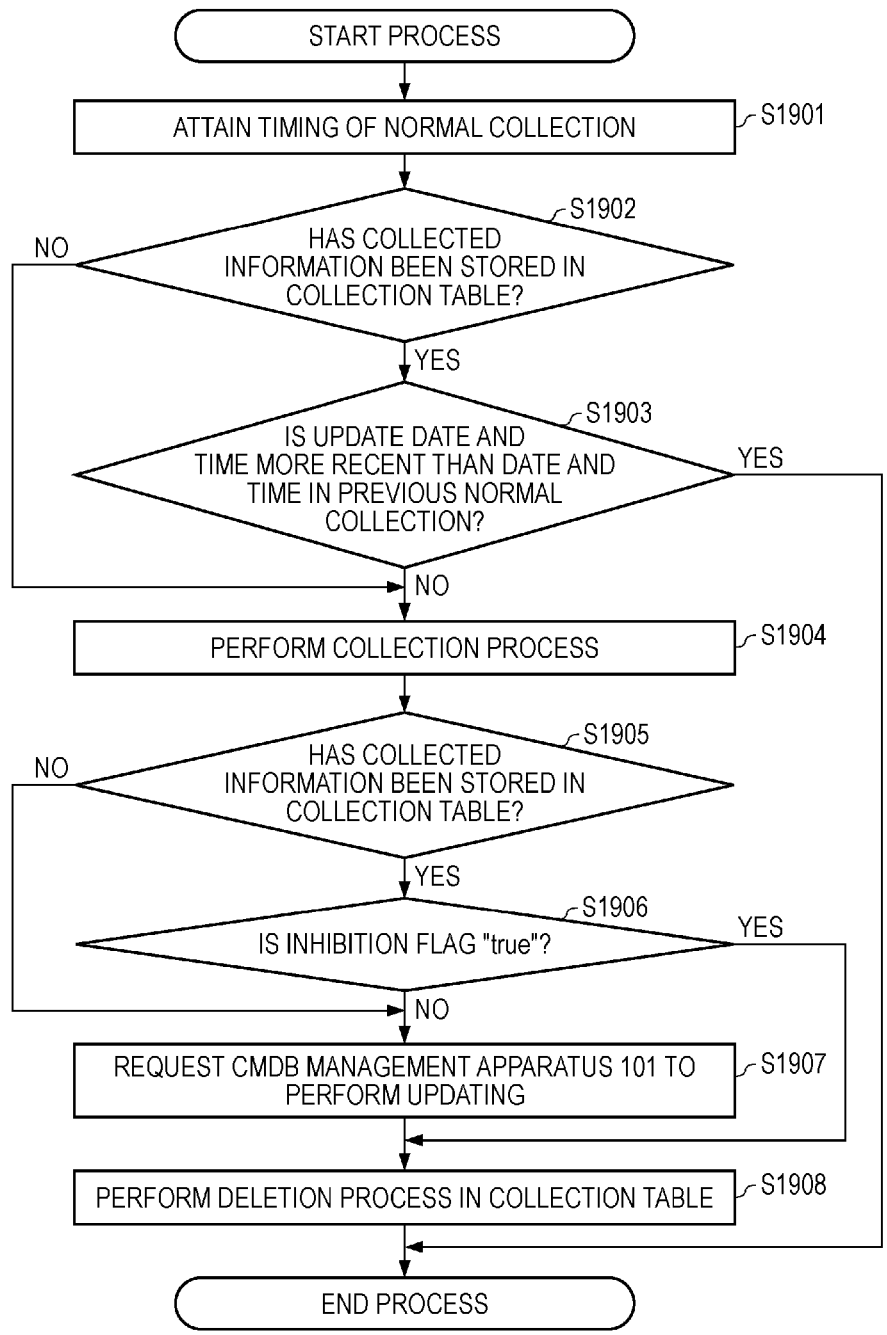
FIG. 19 is a flowchart illustrating a procedure of a process performed by each of the DB management devices when normal collection is performed.
Figure 21:
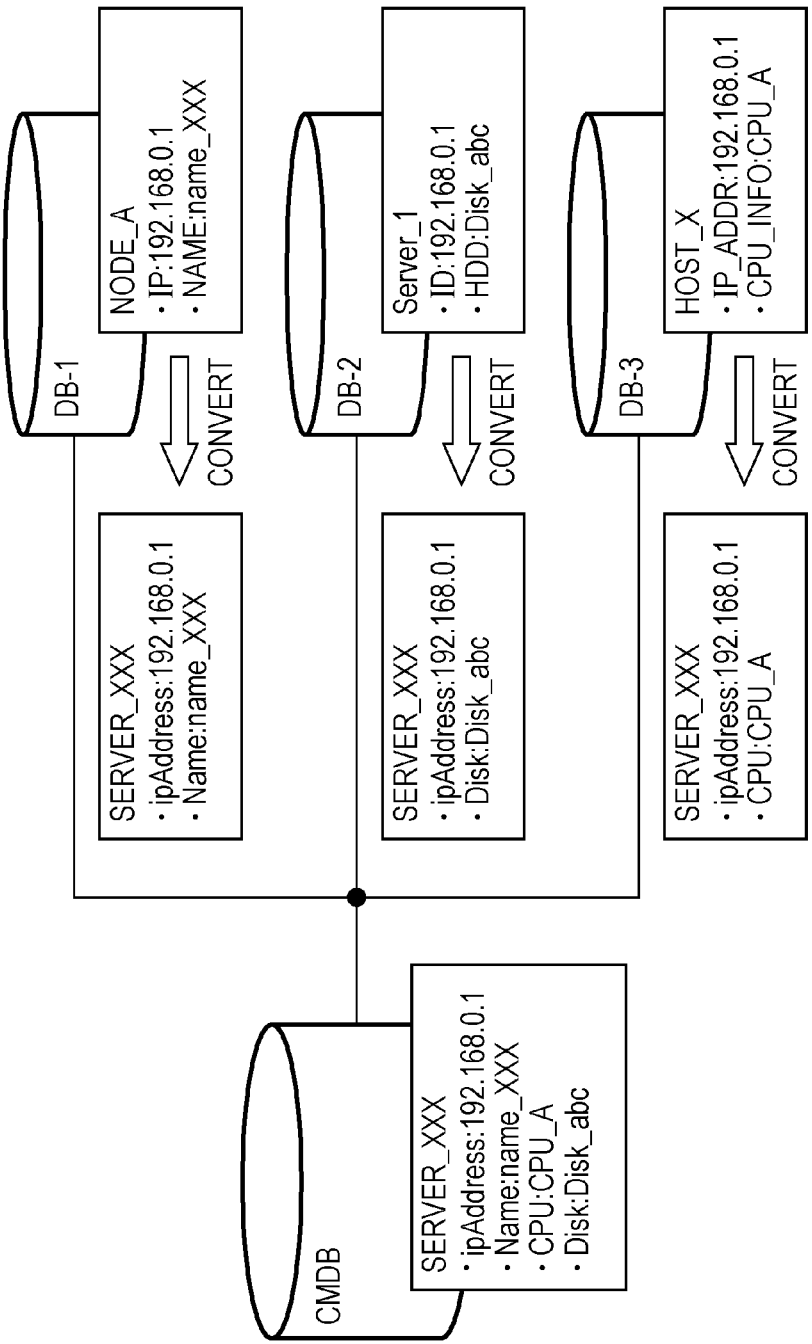
FIG. 21 illustrates related art.

Next, the relationship between periodic transmission of changed information of the DB management devices 102(1) to 102(3) and reception of this collected information will be described by using FIG. 19.

The DB management devices 102(1) to 102(3) determine whether or not to perform transmission of changed data (transmission for normal collection) to the CMDB management apparatus 101 at their respective different transmission intervals. For example, when the DB management devices 102(1) to 102(3) attain their respective timings of normal collection of data, the DB management devices 102(1) to 102(3) each start a process of transmitting changed data to the CMDB management apparatus 101 (step S1901). In addition, here, the process is performed at a different interval or timing for each LID.

First, the collection unit 502 determines whether or not collected information corresponding to a target LID to be determined has been stored in the collected information storage unit 511 (step S1902). When the collection unit 502 determines that collected information corresponding to a target LID to be determined has not been stored in the collected information storage unit 511, the collection unit 502 performs a process of step S1904.

On the other hand, when the collection unit 502 determines that collected information corresponding to a target LID to be determined has been stored in the collected information storage unit 511 in step S1902, the collection unit 502 determines whether or not the update date and time 1706 included in the collected information including the target LID to be determined is more recent than a date and time when transmission to the CMDB management apparatus 101 was performed in a previous transmission process for normal collection for the LID (step S1903).

For example, when a target LID to be determined is DISK_1, FIG. 18 indicates that an update date and time corresponding to collected information corresponding to the target LID to be determined is 10:01:15 on 01/23/2012. On the other hand, update date and time information 2000 in FIG. 20 indicates that a date and time when transmission to the CMDB management apparatus 101 was performed by a previous transmission process for normal collection is 10:00:56 on 01/23/2012. Hence, because transmission on the basis of a collection request from the CMDB management apparatus 101 was performed at a time more recent than the transmission time in the foregoing normal collection, the collection unit 502 may determine that a transmission process for this normal collection is not to be performed.

On the other hand, when the update date and time 1706 corresponding to the collected information corresponding to the target LID to be determined is older than an update date and time 2004, the collection unit 502 performs the process of step S1904.

For normal collection, the collection unit 502 retrieves target data from the DB 520 by using the LID 1501 or the attribute information 1504, as a key, of the target data to be collected and thereby collects changed data to be transmitted to the CMDB management apparatus 101 in step S1904.

After the process of step S1904 has been performed, the collection unit 502 determines whether or not collected information corresponding to the LID has been stored in the collected information storage unit 511 (step S1905). The determination process here is similar to the process performed in step S1902 and the collection unit 502 may therefore use a result obtained by performing determination in step S1902. When the collection unit 502 determines that collected information corresponding to the LID has not been stored in the collected information storage unit 511, the collection unit 502 performs a process of step S1907.

On the other hand, when the collection unit 502 determines that collected information corresponding to the LID has been stored in the collected information storage unit 511 in step S1905, the collection unit 502 determines whether or not a value of the inhibition flag 1505 of the corresponding collected information stored in step S1901 is "true" (step S1906). When the collection unit 502 determines that a value of the inhibition flag 1505 is not "true", the request unit 503 transmits the collected changed data to the CMDB management apparatus 101 so as to make an update request (step S1907).

On the other hand, the collection unit 502 determines that a value of the inhibition flag 1505 is true" in step S1906, the collection unit 502 does not transmit the updated data to the CMDB management apparatus 101.

Subsequently, the update unit 504 performs a deletion process of the stored collected information (step S1908) when the stored collected information satisfies the following condition: the collected information be information corresponding to data which has been updated in the CMDB management apparatus 101 or the collected information be information corresponding to information in which a value of the inhibition flag 1505 is "true" and which has been deleted from the DB 520.

When at least one of the foregoing conditions for deletion is satisfied, the update unit 504 deletes the corresponding collected information stored in the collected information storage unit 511.

As described above, in the embodiment, a DB with a high frequency of update among the DB management devices 102(1) to 102(3) managed by the CMDB management apparatus 101 is decided upon as a master DB. A collection request to collect information stored in DBs other than the master DB is transmitted in accordance with reception of an update request from the master DB. Content of the CMDB management apparatus 101 is updated on the basis of the collected information. According to such an aspect, the CMDB management apparatus 101 according to the embodiment may also collect the information stored in the DBs other than the master DB at a timing of updating updated information stored in the master DB and may update the content of the CMDB management apparatus 101. This unifies update timings of data and may therefore suppress, for example, accidental referencing of data exhibiting inconsistencies by an information processing apparatus which accesses the CMDB management apparatus 101.

In the embodiment, when previous collection of data has been performed on the basis of a request from the CMDB management apparatus 101, the DB management devices 102(1) to 102(3) inhibit collection of data from the DBs 520 based on the received collection request information. This may reduce a processing load for the collection of data from the DBs 520 which is periodically performed by the DB management devices 102(1) to 102(3).

In addition, in the embodiment, when information in the CMDB management apparatus 101 is deleted on the basis of a request from the master DB, an inhibition flag is appended to collection request information corresponding to information integrated with information requested to be deleted, and the collection request information is transmitted to the DB management devices 102(1) to 102(3). The DB management devices 102(1) to 102(3) which have received collected information to which the inhibition flag was appended inhibit transmission of data specified on the basis of the collected information to which the inhibition flag was appended to the CMDB management apparatus 101. This may suppress a problem that data requested to be deleted in the CMDB management apparatus 101 continues to be transmitted to the CMDB management apparatus 101 and the data requested to be deleted thereby continues to be stored without being deleted from the CMDB management apparatus 101.

The foregoing embodiment is mere an example, and the embodiment discussed herein is not limited to this example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing therein a control program that causes a management apparatus to execute an operation, the operation comprising:
   specifying, from among a plurality of databases, a database with the highest frequency of update of target data to be integrated which is stored in the database;
   transmitting, in accordance with acquisition of update data from the specified database, to a database other than the specified database among the plurality of databases, a request to transmit information stored in the database other than the specified database to the management apparatus ; and
   updating the target data to be integrated on the basis of the information transmitted to the management apparatus by the database other than the specified database in accordance with the request.

2. The computer-readable, non-transitory medium according to claim 1,
   wherein the operation further comprises
   updating, for each of the plurality of databases, in accordance with reception of an update request from the database, number information specifying the number of updates performed in the database and time information specifying a time when an update request was received, the number information and the time information being stored in a storage unit,
   calculating a frequency of update on the basis of the number information and the time information, and
   specifying the database with the highest frequency of update on the basis of the calculated frequency of update.

3. The computer-readable, non-transitory medium according to claim 1,
wherein the operation further comprises
inhibiting a database in which data integrated with data specified by the deletion request is stored from transmitting the integrated data to the management apparatus when a deletion request to delete integrated data is received from the specified database.

4. The computer-readable, non-transitory medium according to claim 3,
wherein the operation further comprises
inhibiting transmission of the integrated data to the management apparatus by transmitting flag information for inhibiting transmission of the integrated data to the management apparatus together with the deletion request to the database in which the integrated data is stored.

5. A management apparatus comprising:
a memory; and
a processor coupled to the memory and configured to
specify, from among a plurality of databases, a database with the highest frequency of update of target data to be integrated which is stored in the database,
transmit, in accordance with acquisition of update data from the specified database, to a database other than the specified database among the plurality of databases, a request to transmit information stored in the database other than the specified database to the management apparatus, and
update the target data to be integrated on the basis of the information transmitted to the management apparatus by the database other than the specified database in accordance with the request.

6. An information processing system comprising:
an information processing device including a first memory and a first processor coupled to the first memory that manages each of a plurality of databases; and
a management apparatus including a second memory and a second processor coupled to the second memory that manages data stored in the plurality of databases,
wherein the second processor is configured to
specify, from among the plurality of databases, a database with the highest frequency of update of target data to be integrated which is stored in the database,
transmit, in accordance with acquisition of update data from the specified database, to a database other than the specified database among the plurality of databases, a request to transmit information stored in the database other than the specified database to the management apparatus, and
update the target data to be integrated on the basis of the information transmitted to the management apparatus by the database other than the specified database in accordance with the request, and
the first processor is configured to
update data of a database of the information processing device in accordance with reception of the request, and
transmit updated information to the information processing device.

* * * * *